(12) United States Patent
Suzuki et al.

(10) Patent No.: US 7,585,558 B2
(45) Date of Patent: Sep. 8, 2009

(54) CARBON FIBER-REINFORCED RESIN COMPOSITE MATERIALS

(75) Inventors: Yoshinori Suzuki, Shizuoka (JP); Yutaka Miura, Shizuoka (JP); Katsura Horikoshi, Gunma (JP); Mitsuhiro Yada, Gunma (JP)

(73) Assignees: Toho Tenax Co., Ltd., Bunkyo-ku, Tokyo (JP); Showa Highpolymer Co., Ltd., Chiyoda-ku, Tokyo (JP)

( * ) Notice: Subject to any disclaimer, the term of this patent is extended or adjusted under 35 U.S.C. 154(b) by 216 days.

(21) Appl. No.: 10/543,137

(22) PCT Filed: Jan. 28, 2004

(86) PCT No.: PCT/JP2004/000732

§ 371 (c)(1),
(2), (4) Date: Dec. 1, 2005

(87) PCT Pub. No.: WO2004/067612

PCT Pub. Date: Aug. 12, 2004

(65) Prior Publication Data

US 2006/0154039 A1 Jul. 13, 2006

(30) Foreign Application Priority Data

Jan. 30, 2003 (JP) ............................. 2003-022384

(51) Int. Cl.
*D04H 13/00* (2006.01)
(52) U.S. Cl. ............... 428/292.1; 428/364; 428/375
(58) Field of Classification Search ............... 428/292.1, 428/364, 375
See application file for complete search history.

(56) References Cited

U.S. PATENT DOCUMENTS

| 4,853,279 A | 8/1989 | Shibata et al. ............... 428/267 |
| 2002/0007022 A1* | 1/2002 | Oosedo et al. ............... 525/527 |
| 2005/0271874 A1* | 12/2005 | Sakajiri et al. ............... 428/364 |

FOREIGN PATENT DOCUMENTS

| JP | 56-73174 | 6/1981 |
| JP | 57-079345 | 5/1982 |
| JP | 05-040768 | 10/1987 |
| JP | 63-105178 | 5/1988 |
| JP | 6-218671 | 8/1994 |
| JP | 6-350573 | 12/1994 |
| JP | 11-093078 | 4/1999 |
| JP | 2000-355881 | 12/2000 |
| JP | 2002-013069 | 1/2002 |
| JP | 2003-292633 | 10/2003 |
| WO | WO 02/099180 A1 | 12/2002 |

* cited by examiner

*Primary Examiner*—D. Lawrence Tarazano
*Assistant Examiner*—Camie S Thompson
(74) *Attorney, Agent, or Firm*—Bruce S. Londa; Norris McLaughlin & Marcus, PA

(57) ABSTRACT

The present invention discloses:
a composition comprising (A) an epoxy group-containing vinyl ester resin having, in the molecule, 0.8 to 0.3 equivalent of epoxy group and 0.2 to 0.7 equivalent of an ethylenically unsaturated group, (B) a radical-polymerizable monomer, (C) a curing agent, and (D) a carbon fiber impregnated with 0.5 to 5% by mass of (d) a vinyl ester resin as a sizing agent, obtained by an addition reaction of an epoxy resin and an ethylenically unsaturated carboxylic acid, and a carbon fiber-reinforced resin composite material produced by curing the above composition.

10 Claims, 8 Drawing Sheets

CARBON FIBER-REINFORCED RESIN COMPOSITE MATERIALS

TECHNICAL FIELD

The present invention relates to a carbon fiber-reinforced resin composite material superior in properties such as strength and the like, as well as to a composition for production of carbon fiber-reinforced resin composite material, suitably used in molding such as pultrusion or the like.

BACKGROUND ART

Carbon fiber is characterized in that, as compared with other fibers, it has a high strength and a high elastic modulus and is light. Therefore, carbon fiber is in wide use for production of composite material products (molded articles) used in various fields such as aviation and space field, sports field and the like. Carbon fiber is being used as a reinforcing material for composite material products containing a thermosetting resin or a thermoplastic resin as the matrix resin. As the matrix resin, a thermosetting resin is often used for its easy moldability and handling.

As the method for molding a composite material containing a thermosetting resin as the matrix resin, there is a method which comprises impregnating a resin into a fiber (a reinforcing material) to make the resin-impregnated fiber into a sheet-shaped prepreg (an intermediate material), and subjecting the prepreg to molding. As other molding methods, there are a pultrusion method, a resin transfer molding (RTM) method, a filament winding (FW) method, a sheet molding compound (SMC) method, a bulk molding compound (BMC) method, a hand lay-up method, etc.

Of these methods, the pultrusion method is suited for production of a long product having a given sectional shape and moreover has an advantage of allowing low-cost molding. As the matrix resin used in this molding method, vinyl ester resins containing substantially or completely no epoxy group have been used in many cases.

The wettability between carbon fiber and vinyl ester resin is poor. Therefore, in composite materials containing a vinyl ester resin as the matrix resin, glass fiber is used mainly as a reinforcing material for the composite material. When a composite material used in applications requiring a strength is produced using a glass fiber, as compared with when there is produced a carbon fiber-reinforced resin composite material containing an epoxy resin as the matrix resin, the amount of glass fiber used need be increased. Therefore, when a composite material of particular strength is produced using a glass fiber as the reinforcing material, as compared with when a carbon fiber is used as the reinforcing material, the composite material produced has drawbacks in that it has an increased sectional area and an increased mass.

As the technique for improving the wettability between carbon fiber and unsaturated matrix resin (e.g. vinyl ester resin) to obtain a high-strength composite material, there is a method of adhering a vinyl ester resin to a carbon fiber (JP-B-1987-18671, Claim 1). In Claim 1 of JP-A-1988-50573 is disclosed a sizing agent for carbon fiber, containing an unsaturated urethane compound as the main component. In Claims 1 to 3 of JP-A-1999-93078 is described a carbon fiber impregnated with a sizing agent having a terminal unsaturated group (e.g. vinyl group) and a polar group (e.g. amide group). In Claim 1 of JP-A-1988-105178 is proposed a method of coating, to a carbon fiber, an ester compound having unsaturated bonds at the two terminals of the molecule, synthesized from a glycidyl ester of an unsaturated monocarboxylic acid and a diol.

In the above method of coating an unsaturated compound to a carbon fiber, described in the above literature, the unsaturated compound coated to the carbon fiber surface and the vinyl ester resin give rise to chemical bonding mainly due to the thermal polymerization taking place between the respective unsaturated groups. However, the bonding between the carbon fiber surface and the compound coated to the carbon fiber surface is adsorption and accordingly is weak. Consequently, peeling tends to occur at the interface between the carbon fiber surface and the vinyl ester resin. As a result, a composite material produced by pultrusion using this method shows no expected high strength in many cases.

In JP-B-1993-40768 is described a curable composition for production of fiber-reinforced resin, which comprises:
an epoxy group-containing acrylate resin containing, in the molecule, an unsaturated ester group in an amount of 0.2 to 0.7 equivalent per 1 equivalent of epoxy group,
a radical-polymerizable monomer,
an organic peroxide,
a curing agent for epoxy resin, and
a carbon fiber.

However, since this composition is insufficient in impregnation rate of matrix resin into reinforcing fiber, the composition has a problem in workability in production of molded article.

DISCLOSURE OF THE INVENTION

The present inventors made an investigation to improve the properties of a carbon fiber-reinforced vinyl ester resin composite material (a molded article) obtained by pultrusion.

As a result, the present inventors found that when there is cured a composition comprising an epoxy group-containing vinyl ester resin having, in the molecule, epoxy group and an ethylenically unsaturated group at given proportions, a radical-polymerizable monomer, a curing agent, and a carbon fiber impregnated with a particular sizing agent, there can be obtained a carbon fiber-reinforced resin composite material which has high compatibility between the carbon fiber and the matrix resin and is superior in properties such as bending strength and the like.

In the above, it is particularly important to use a carbon fiber bundle impregnated with a particular sizing agent. By using such a carbon fiber strand impregnated with a particular sizing agent, the above-mentioned vinyl ester resin is rapidly and uniformly impregnated into between the individual carbon fibers constituting the carbon fiber strand and, as a result, the composite material obtained has higher properties. The present invention has been completed based on the above finding.

Therefore, the present invention aims at providing:
a composition for production of a carbon fiber-reinforced resin composite material which can be produced by pultrusion and which shows greatly superior properties, and
a carbon fiber-reinforced resin composite material produced by molding the above composition.

In the present carbon fiber-reinforced resin composite material, there takes place radical polymerization by heating, between essential components, i.e. the epoxy group-containing vinyl ester resin (A), the radical-polymerizable monomer (B) and the vinyl ester resin (d) contained in the sizing agent, obtained by an addition reaction between an epoxy resin and an ethylenically unsaturated carboxylic acid, to form a matrix resin. This matrix resin has good compatibility with the carbon fiber and high adhesivity is obtained at the interface between the matrix resin and the carbon fiber. Accordingly, the carbon fiber-reinforced resin composite material obtained by pultrusion of the present composition is superior in properties such as bending strength and the like.

The present invention is as described below.

(1) A carbon fiber-reinforced resin composite material produced by curing a composition comprising:
   (A) an epoxy group-containing vinyl ester resin having, in the molecule, 0.8 to 0.3 equivalent of epoxy group and 0.2 to 0.7 equivalent of an ethylenically unsaturated group,
   (B) a radical-polymerizable monomer,
   (C) a curing agent, and
   (D) a carbon fiber impregnated with 0.5 to 5% by mass of (d) a vinyl ester resin as a sizing agent, obtained by an addition reaction of an epoxy resin and an ethylenically unsaturated carboxylic acid.

(2) A carbon fiber-reinforced resin composite material according to (1), wherein the curing agent (C) comprises an organic peroxide curing agent and a curing agent for epoxy resin.

(3) A carbon fiber-reinforced resin composite material according to (2), wherein the curing agent for epoxy resin is an imidazole.

(4) A carbon fiber-reinforced resin composite material according to (1), wherein the ethylenically unsaturated group possessed by the epoxy group-containing vinyl ester resin (A) is an acrylic acid residue or a methacrylic acid residue.

(5) A carbon fiber-reinforced resin composite material according to (1), which has a Tg of 150° C. or higher.

(6) A composition for production of carbon fiber-reinforced resin composite material, comprising:
   (A) an epoxy group-containing vinyl ester resin having, in the molecule, 0.8 to 0.3 equivalent of an epoxy group and 0.2 to 0.7 equivalent of an ethylenically unsaturated group,
   (B) a radical-polymerizable monomer,
   (C) a curing agent, and
   (D) a carbon fiber impregnated with 0.3 to 5% by mass of (d) a vinyl ester resin as a sizing agent, obtained by an addition reaction of an epoxy resin and an ethylenically unsaturated carboxylic acid.

(7) A composition for production of carbon fiber-reinforced resin composite material according to (6), wherein the curing agent (C) comprises an organic peroxide curing agent and a curing agent for epoxy resin.

(8) A composition for production of carbon fiber-reinforced resin composite material according to (6), wherein the curing agent for epoxy resin is an imidazole.

(9) A composition for production of carbon fiber-reinforced resin composite material according to (6), wherein the ethylenically unsaturated group possessed by the epoxy group-containing vinyl ester resin (A) is an acrylic acid residue or a methacrylic acid residue.

(10) A composition for production of carbon fiber-reinforced resin composite material according to (6), which comprises:
   the epoxy group-containing vinyl ester resin (A) in an amount of 100 parts by mass,
   the radical-polymerizable monomer (B) in an amount of 10 to 50 parts by mass,
   the organic peroxide contained in the curing agent (C), in an amount of 0.1 to 5 parts by mass relative to 100 parts by mass of the total of the components (A) and (B),
   the curing agent for epoxy resin contained in the curing agent (C), in an amount of 0.1 to 5 parts by mass relative to 100 parts by mass of the total of the components (A) and (B),
   the sizing agent in an amount of 0.3 to 5% by mass based on the carbon fiber (D) impregnated with the sizing agent, and
   the carbon fiber (D) in an amount of 50 to 80% by mass based on the total mass of the composition for production of carbon fiber-reinforced resin composite material.

(11) A process for producing a carbon fiber-reinforced resin composite material, which comprises kneading a resin mixture of (A) an epoxy group-containing vinyl ester resin having, in the molecule, 0.8 to 0.3 equivalent of epoxy group and 0.2 to 0.7 equivalent of an ethylenically unsaturated group, (B) a radical-polymerizable monomer and (C) a curing agent, with (D) a carbon fiber impregnated with 0.3 to 5% by mass of (d) a vinyl ester resin as a sizing agent, obtained by an addition reaction of an epoxy resin and an ethylenically unsaturated carboxylic acid.

(12) A process for producing a pultrusion product, which comprises kneading a resin mixture of (A) an epoxy group-containing vinyl ester resin having, in the molecule, 0.8 to 0.3 equivalent of epoxy group and 0.2 to 0.7 equivalent of an ethylenically unsaturated group, (B) a radical-polymerizable monomer and (C) a curing agent, with (D) a carbon fiber impregnated with 0.3 to 5% by mass of (d) a vinyl ester resin as a sizing agent, obtained by an addition reaction of an epoxy resin and an ethylenically unsaturated carboxylic acid, to obtain a composition for production of carbon fiber-reinforced resin composite material and then subjecting the composition for production of carbon fiber-reinforced resin composite material to pultrusion.

BEST MODE FOR CARRYING OUT THE INVENTION

Figure 1:
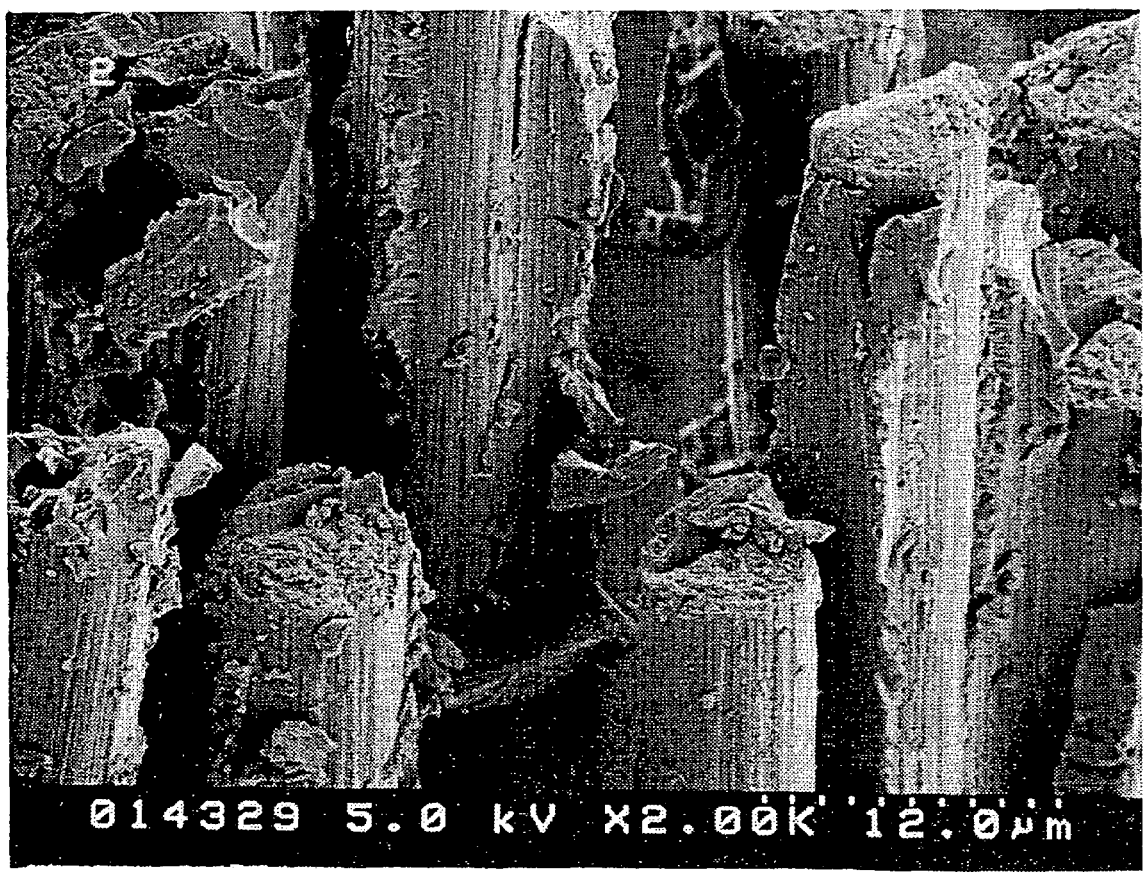
FIG. 1, FIG. 2, FIG. 3, FIG. 4, FIG. 5, FIG. 6, FIG. 7 and FIG. 8 are each an electron micrograph showing a fracture cross-section of the carbon fiber-reinforced resin composite material obtained in Example 1, Example 2, Example 3, Comparative Example 1, Comparative Example 2, Comparative Example 3, Comparative Example 4 or Comparative Example 5.
Figure 2:
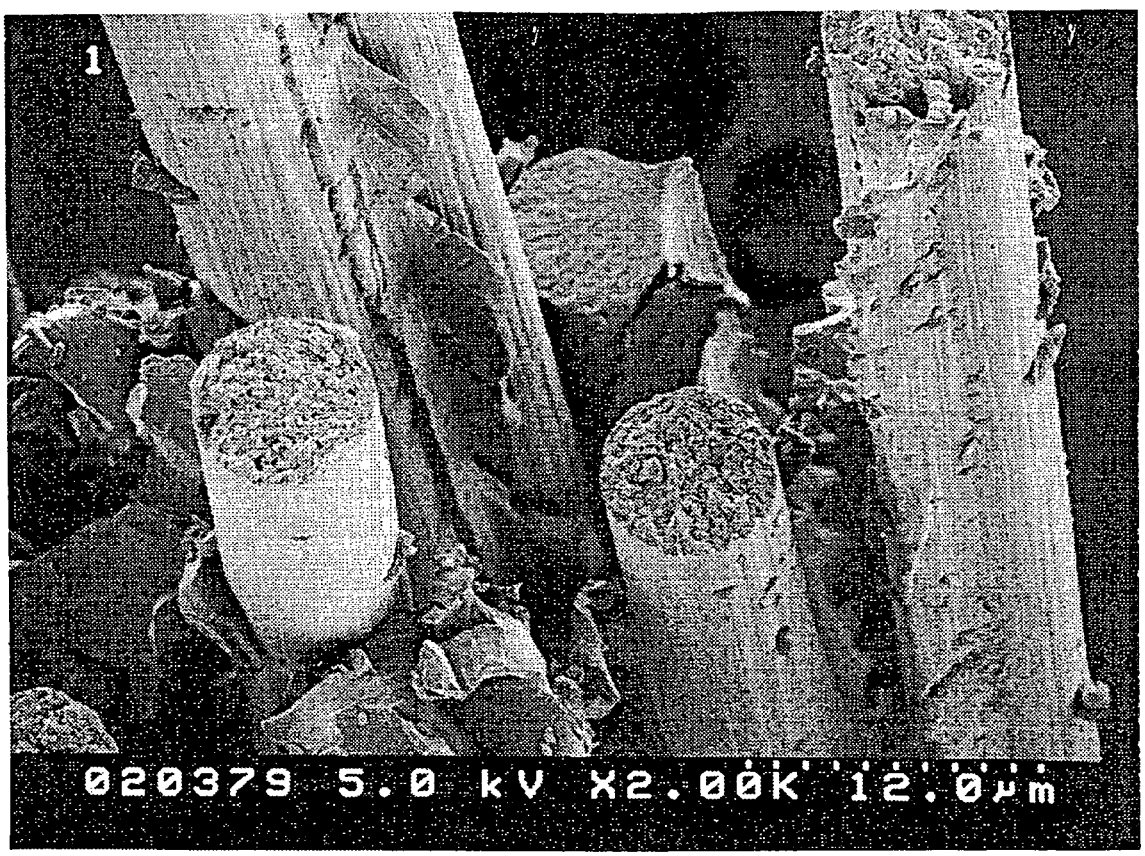
Figure 3:
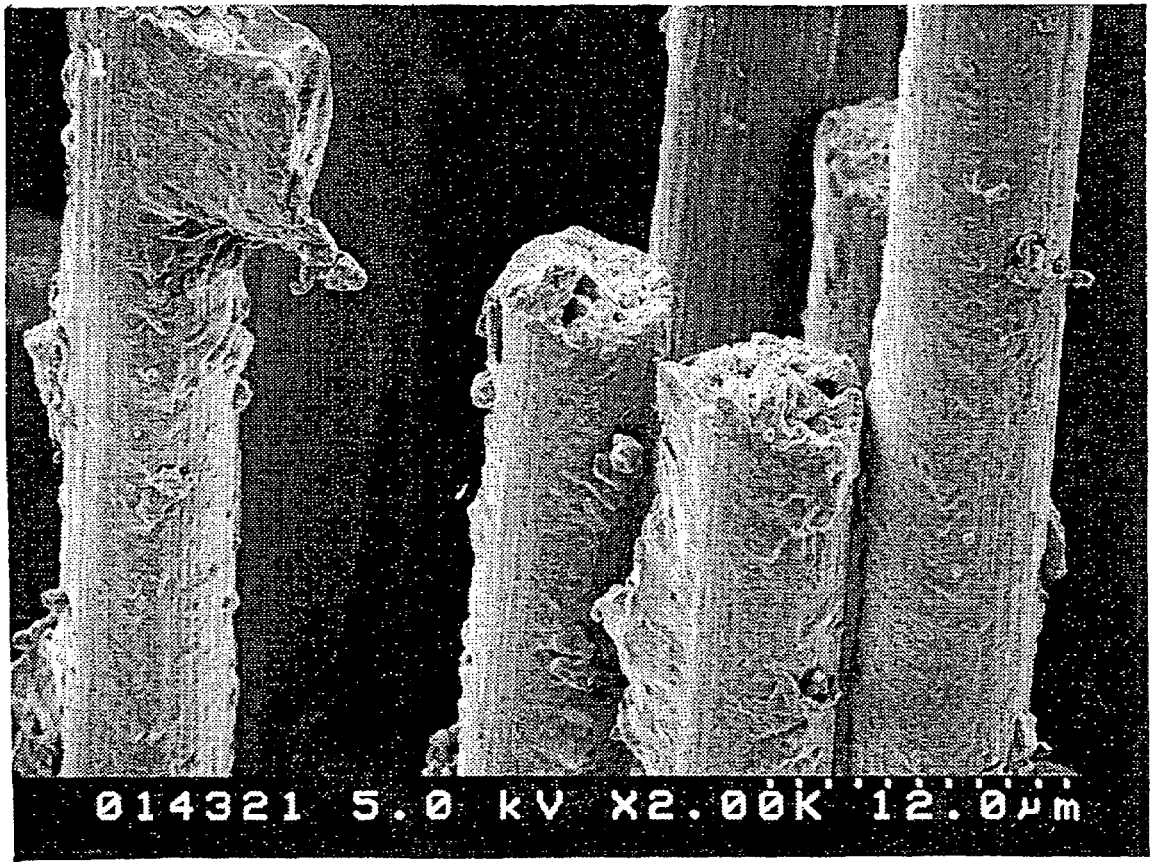

The composition for carbon fiber-reinforced resin composite material according to the present invention is an uncured composition comprising as essential components,
   (A) an epoxy group-containing vinyl ester resin having 0.8 to 0.3 equivalent of epoxy group and 0.2 to 0.7 equivalent of an ethylenically unsaturated group, obtained by reacting an epoxy resin having two or more epoxy groups in the molecule with an ethylenically unsaturated carboxylic acid of 0.2 to 0.7 equivalent relative to 1 equivalent of the epoxy group,
   (B) a radical-polymerizable monomer,
   (C) a curing agent, and
   (D) a carbon fiber impregnated with (d) a vinyl ester resin as a sizing agent, obtained by an addition reaction of an epoxy resin and an ethylenically unsaturated carboxylic acid.

The carbon fiber-reinforced resin composite material according to the present invention is a composite material (a molded article) produced by curing the above composition.

The epoxy group-containing vinyl ester resin (A) has high compatibility with the carbon fiber and well wets the surface of the carbon fiber. Therefore, the adhesivity at the interface between the cured matrix resin and the carbon fiber is high.

This allows the carbon fiber-reinforced resin composite material to have superior properties.

As the epoxy group-containing vinyl ester resin (A), there can be mentioned epoxy group-containing vinyl ester resins such as bisphenol A monoglycidyl ether monomethacrylate, bisphenol A diglycidyl ether monomethacrylate and the like.

The epoxy group-containing vinyl ester resin (A) can be obtained, for example, by reacting an epoxy resin having, in the molecule, two or more, preferably 2 to 6 epoxy groups with an ethylenically unsaturated carboxylic acid.

The epoxy resin can be exemplified by a bisphenol type epoxy resin and a novolac type epoxy resin.

The ethylenically unsaturated carboxylic acid can be exemplified by acrylic acid and methacrylic acid.

In the above reaction, 1 equivalent of the epoxy group of the epoxy resin is reacted with 0.2 to 0.7 equivalent of the ethylenically unsaturated carboxylic acid. The reaction proceeds nearly stoichiometrically. Therefore, by reacting them in the above equivalent ratio range, there can be obtained an epoxy group-containing vinyl ester resin containing epoxy group of 0.8 to 0.3 equivalent in equivalent ratio and an ethylenically unsaturated carboxylic acid ester group of 0.2 to 0.7 equivalent in equivalent ratio.

When the ethylenically unsaturated carboxylic acid ester group is reacted in an amount of less than 0.2 equivalent per 1 equivalent of epoxy group, the resulting composition for carbon fiber-reinforced resin composite material is low in curing rate.

When the ethylenically unsaturated carboxylic acid ester group is reacted in an amount of more than 0.7 equivalent per 1 equivalent of epoxy group, the adhesivity at the interface between the carbon fiber and the matrix resin is poor. That is, the interface adhesivity is about the same as in a carbon fiber-reinforced resin composite material containing an ordinary vinyl ester resin substantially free from epoxy group.

As the epoxy resin having two or more epoxy groups in the molecule, to be reacted with the ethylenically unsaturated carboxylic acid, there can be mentioned resins such as glycidyl ether obtained by condensation of bisphenol with epihalohydrin; novolac type glycidyl ether obtained by condensation of phenol and cresol novolac with epihalohydrin; halogenated glycidyl ether obtained by condensation of halogenated bisphenol and halogenated novolac with epihalohydrin; amine type glycidyl ether obtained by condensation of diaminodiphenylmethane and diaminodiphenylsulfone or aminophenol with epihalohydrin; triazine type glycidyl ether obtained by condensation of cyanuric acid and isocyanuric acid with epihalohydrin; glycidyl esters obtained by condensation of polybasic acid (e.g. phthalic acid, terephthalic acid or isophthalic acid) with epihalohydrin; glycidyl ether obtained by condensation of alkylene oxide adduct of bisphenol with epihalohydrin; and the like. These resins can be used singly or in combination of two or more kinds.

The epoxy equivalent of the epoxy resin containing two or more epoxy groups in the molecule is preferably 100 to 1,000. When the epoxy equivalent of the epoxy resin is less than 100, the cured resin tends to be inferior in properties, particularly in flexibility. When the epoxy equivalent of the epoxy resin is more than 1,000, the resin has a high viscosity; as a result, in producing a composition for carbon fiber-reinforced resin composite material, the resin tends to have low impregnation property into between carbon fibers.

The molecular weight of the epoxy group-containing vinyl ester resin obtained by the above reaction is preferably 300 to 5,000 in terms of weight-average molecular weight.

A known polymerization inhibitor such as hydroquinone, monomethylhydroquinone, tert-butylhydroquinone, p-benzoquinone, copper salt or the like may be added in order to increase the storage stability of the epoxy group-containing vinyl ester resin obtained by the above reaction and control the radical polymerization rate of the resin.

A surfactant may be added beforehand to the epoxy group-containing vinyl ester resin. This addition can prevent the generation of bubbles taking place during the mixing and kneading of the epoxy group-containing vinyl ester resin with a curing agent, conducted before molding. Further, the addition can decrease the pultrusion resistance caused by the adhesion of epoxy group-containing vinyl ester resin to mold.

The radical-polymerizable monomer (B) gives rise to radical polymerization with the epoxy group-containing vinyl ester resin (A) to form a high-molecular compound. Further, the monomer (B) allows the composition for carbon fiber-reinforced resin composite material, containing the epoxy group-containing vinyl ester resin (A) to have an appropriate viscosity and promotes impregnation of the epoxy group-containing vinyl ester resin (A) into the carbon fiber (D).

Since the epoxy group-containing vinyl ester resin (A) has a high viscosity per se, its impregnation into the carbon fiber (a reinforcing material), etc. tends to be insufficient. By addition of the radical-polymerizable monomer (B) such as styrene or the like, the epoxy group-containing vinyl ester resin (A) is diluted and its viscosity is reduced; as a result, the impregnation property into the carbon fiber (D) is heightened.

When there is present no radical-polymerizable monomer (B), the impregnation of the epoxy group-containing vinyl ester resin (A) into the carbon fiber (D) takes a long time and the productivity of composition for carbon fiber-reinforced resin composite material is deteriorated significantly.

As the radical-polymerizable monomer (B), there can be used vinyl monomers such as styrene, vinylstyrene, chlorostyrene and the like; and (meth)acrylate monomers such as ethylene glycol di(meth)acrylate, propylene glycol di(meth)acrylate, diethylene glycol di(meth)acrylate, dipropylene glycol di(meth)acrylate, hexanediol di(meth)acrylate, neopentyl glycol di(meth)acrylate, glycerine tri(meth)acrylate, glycerine di(meth)acrylate, trimethylolethane tri(meth)acrylate, trimethylolpropane tri(meth)acrylate, trimethylolethane di(meth)acrylate, pentaerythritol tetra(meth)acrylate, pentaerythritol tri(meth)acrylate and the like.

The radical-polymerizable monomer (B) is compounded in an amount of preferably 10 to 50 parts by mass relative to 100 parts by mass of the epoxy group-containing vinyl ester resin (A).

The curing agent (C) is preferred to be an organic peroxide. The organic peroxide cures the ethylenically unsaturated group bonded with the epoxy group-containing vinyl ester resin (A) and also the radical-polymerizable monomer (B).

The curing agent (C) is preferably a combination of the organic peroxide curing agent and an epoxy resin-curing agent capable of curing epoxy resin. By using the epoxy resin-curing agent in combination with the organic peroxide curing agent, the epoxy group-containing vinyl ester resin is cured completely.

The organic peroxide curing agent can be exemplified by benzoyl peroxide, dimyristyl peroxydicarbonate, dicumyl peroxide, 1,1-bis(tert-butylperoxy)-3,3,5-trimethylsiloxane, lauroyl peroxide, cyclohexanone peroxide, tert-butyl peroxy-2-ethylhexanoate, tert-hexyl peroxy-2-ethylhexanoate, tert-butyl peroxybenzoate and bis(4-tert-butylcyclohexyl) peroxydicarbonate. There can also be used redox type curing agents such as ketone peroxide (e.g. methyl ethyl ketone peroxide) and cobalt salt, cumene hydroperoxide and manganese salt, benzoyl peroxide and dimethylaniline, and the like.

The amount of the organic peroxide curing agent used is preferably 0.1 to 5 parts by mass relative to 100 parts by mass of the total of the epoxy group-containing vinyl ester resin (A) and the radical-polymerizable monomer (B). The above organic peroxide curing agents may be used singly or in combination of two or more kinds.

As the curing agent for epoxy resin, there can be mentioned an imidazole, an amine, an acid anhydride, a polyphenol, a latent curing agent, etc. Of these, the imidazole is preferred because it is superior in curing ability in an intermediate to high temperature range and also superior in resin life after addition of curing agent.

As the imidazole, there can be mentioned 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, etc.

As the amine, there can be mentioned aliphatic polyamines such as diethylenetriamine, triethylenetetramine, tetraethylenepentamine, dipropylenediamine, diethylaminopropylamine, menthenediamine, isophoronediamine and the like; and aromatic polyamines such as metaphenylenediamine, diaminodiphenylmethane, diaminodiphenyl sulfone, metaxylylenediamine and the like.

As the acid anhydride, there can be mentioned phthalic anhydride, maleic anhydride, itaconic anhydride, succinic anhydride, trimellitic anhydride, pyromellitic anhydride, hexahydrophthalic anhydride, tetrahydrophthalic anhydride, methylnadic anhydride, methyltetrahydrophthalic anhydride, benzophenonetetracarboxylic anhydride, methylhexahydrophthalic anhydride, methylcyclohexenetetracarboxylic anhydride, etc.

As the polyphenol, there can be mentioned phenol novolac, cresol novolac, polyvinylphenol, etc.

As the latent curing agent, there can be mentioned basic active hydrogen compounds such as dicyandiamide, organic acid dihydrazide and the like; Lewis acid salts such as boron trifluoride amine salt and the like; Brønsted acid salts; amine imides; and so forth.

These curing agents for epoxy resin can be used in an amount of 0.5 to 70 parts by mass relative to 100 parts by mass of the total of the epoxy group-containing vinyl ester resin (A) and the radical-polymerizable monomer (B). They can be used singly or in combination of two or more kinds.

It is possible to also use a curing accelerator for epoxy resin which is ordinarily used. It is possible to use, in combination with the curing agent, a curing accelerator such as tertiary amine for acid anhydride type curing agent, or salicyclic acid or dicyandiamide for amine type curing agent.

The carbon fiber (D) used in the present invention is a carbon fiber strand obtained by impregnating carbon fiber filaments with a sizing agent and bundling them.

The sizing agent contains, as an essential component, a vinyl ester resin (d) obtained by an addition reaction between an epoxy resin and an ethylenically unsaturated carboxylic acid. This vinyl ester resin (d) contains substantially no epoxy group.

The vinyl ester resin (d) has heat resistance and appropriate reactivity. The ethylenically unsaturated group of the vinyl ester resin (d) has radical polymerizability; therefore, the epoxy group-containing vinyl ester resin (A), the radical-polymerizable monomer (B) and the vinyl ester resin (d) contained in the sizing agent give rise to copolymerization and curing. Further, there rises a reaction between various functional groups present on the surface of the carbon fiber (D) and the epoxy group of the epoxy group-containing vinyl ester resin (A), whereby a strong bond is formed between them. This bond between various functional groups present on the carbon fiber surface and the epoxy group of the epoxy group-containing vinyl ester resin is similar to the bond in known carbon fiber-reinforced epoxy resin composite material and is strong.

When the sizing agent contains no vinyl ester resin (d), infiltration of the epoxy group-containing vinyl ester resin into the carbon fiber is inferior and, moreover, in the composite material obtained by molding, adhesion between matrix resin and carbon fiber is poor. As a result, the carbon fiber-reinforced resin composite material obtained is inferior in properties.

As the vinyl ester resin (d), it is possible to also use a vinyl ester resin obtained by reacting a known epoxy resin with an ethylenically unsaturated carboxylic acid. In the molecules of this compound, substantially no epoxy group is contained. The ethylenically unsaturated carboxylic acid can be exemplified by acrylic acid and methacrylic acid.

The average molecular weight of the vinyl ester resin (d) is preferably 400 to 3,000, more preferably 500 to 2,000.

In the vinyl ester resin (d) used as a sizing agent, the ethylenically unsaturated group may be bonded to any of the side chains and the main chain. A chain high-molecular compound having an ethylenically unsaturated carboxylic acid ester group at the two terminals of the molecule is preferred. As the vinyl ester resin (d) used as a sizing agent, there is preferred a chain high-molecular compound having an ethylenically unsaturated group at the two terminals of the main chain, because it is easy to control a curing reaction with such a compound.

As the vinyl ester resin (d) used as a sizing agent, there can be mentioned, for example, bisphenol-A epoxy based vinyl ester resins (methacrylate type) (Epoxy Ester 3000M and Epoxy Ester 3002M, both produced by Kyoeisha Chemical Co., Ltd.). However, the resin (d) is not restricted thereto.

The sizing agent may contain, as supplementary components, resins such as epoxy resin, urethane resin, polyester resin, vinyl ester resin, polyamide resin, polyether resin, acrylic resin, polyolefin resin, polyimide resin and the like, and modification products thereof. These supplementary components may be used singly or in combination of two or more kinds.

When these supplementary components are used, the vinyl ester resin (d) as an essential component is used in the sizing agent in an amount of preferably 30% by mass or more.

The amount of the sizing agent impregnated into the carbon fiber is preferably 0.3 to 5.0% by mass, more preferably 1.0 to 4.0% by mass of the carbon fiber. When the impregnation amount of the sizing agent is less than 0.3% by mass, the adhesivity between the carbon fiber and the matrix resin tends to be low and the poor sizing of the carbon fiber tends to make the operability bad. Meanwhile, when the adhesion amount of the sizing agent is more than 5.0% by mass, the impregnation of the epoxy group-containing vinyl ester resin into the carbon fiber strand tends to be difficult.

The carbon fiber (D) used in the present invention is preferably a carbon fiber derived from polyacrylonitrile (PAN), rayon, pitch or the like. These carbon fibers (D) are each produced by spinning by known method, flame retardation treatment (infusion treatment), carbonization and, as necessary, graphitization. These carbon fibers (D) are supplied ordinarily in the form of a strand which is a bundle of 1,000 to 50,000 filaments.

In the present invention, of these carbon fibers, the PAN-based carbon fiber is used particularly preferably for its easy handling and easy flow through production line. Here, the PAN-based carbon fiber is a fiber produced by using, as a starting material, a copolymer containing an acrylonitrile structural unit as a main component and also containing a vinyl monomer unit (e.g. itaconic acid, acrylic acid, acrylic ester or acrylamide) in an amount of 10 mol % or less, heat-treating the copolymer in an oxidizing atmosphere for flame retardation, and carbonizing or graphitizing the heat-treated copolymer in an inert atmosphere.

These carbon fibers are ordinarily surface-treated. The method for surface treatment is largely divided into a liquid-phase treatment and a gas-phase treatment. The surface treatment method employed can be selected appropriately so as to match the production process employed actually. An electrochemical oxidation in aqueous solution is preferred for stable operation and uniform surface treatment. The carbon fiber after surface treatment is washed thoroughly, whereby the electrolyte adhered during the electrochemical oxidation is removed.

The degree of surface treatment of the carbon fiber can be judged by measuring the oxygen concentration ratio O/C at carbon fiber surface by an X-ray photoelectron spectrometry. The O/C ratio is preferably 0.1 to 0.3 in order to give rise to a reaction between the matrix resin and the carbon fiber surface and thereby increase the adhesivity between them.

The O/C ratio can be determined, for example, by the following method. A sizing agent-free carbon fiber is placed in the measurement chamber of reduced pressure ($10^{-6}$ Pa), of an X-ray photoelectron spectrometer (electron spectrometer for chemical analysis), ESCA JPS-9000MX produced by Japan Electron Optical Laboratory Co., Ltd. To the carbon fiber is applied an X-ray generated with Mg used as an counter electrode, under the conditions of an electron beam acceleration voltage of 10 kV and a current of 10 mA. The spectra of the photoelectrons of carbon atom and oxygen atom generated by the X-ray application are measured and the areal ratio thereof is calculated. The proportions of the photoelectrons generated differ depending upon the individual elements. The sensitivity factor when the characteristics of the X-ray photoelectron spectrometer (electron spectrometer for chemical analysis), ESCA JPS-9000MX produced by Japan Electron Optical Laboratory Co., Ltd. has been taken into consideration, is 2.69. This measurement method per se is known.

The surface-treated carbon fiber is impregnated with the above-mentioned sizing agent. By impregnating the sizing agent into the carbon fiber, the carbon fiber filaments are converged, generation of fluffs is prevented, and the handleability of the carbon fiber filaments is improved. Further, impregnation of the epoxy group-containing vinyl ester resin into between the carbon fiber filaments is made easier. Furthermore, when the present composition is cured, the carbon fiber surface and the matrix resin are bonded chemically by a copolymerization reaction and the adhesivity between them is enhanced.

As the method for impregnating the sizing agent into the carbon fiber, there can be appropriately adopted a known method such as spraying method, dipping method, transfer method or the like. The dipping method is preferred particularly for its wide usability, high efficiency and uniform impregnatability.

In the dipping method, it is preferred that in dipping the carbon fiber in the sizing agent solution, the opening and squeezing of the carbon fiber strand are repeated by the dipping roller provided in the sizing agent solution. By this operation, the sizing agent is impregnated uniformly into the inside of the carbon fiber strand.

In the impregnation with the sizing agent according to the dipping method, there may be used a solvent method in which the sizing agent is dissolved in a solvent such as acetone or the like and the carbon fiber is immersed in the resulting solution. However, there is preferred an emulsion method in which the carbon fiber is immersed in an aqueous emulsion obtained by emulsifying the sizing agent using an emulsifier or the like, because this method ensures safety to human body and prevents the pollution of natural environment.

It is possible to add an auxiliary agent such as dispersant, emulsifier or the like in order to improve the handleability, abrasive resistance and impregnation ability of carbon fiber and prevent the fluffing of carbon fiber. These auxiliary agents may be added beforehand to the sizing agent or may be added to the carbon fiber. The amount of the auxiliary agent is preferably 70% by mass or less of the amount of the sizing agent impregnated into the carbon fiber.

After the impregnation with the sizing agent, the carbon fiber strand is sent to an ordinary drying step. In this step, the water as a dispersant or the solvent used in the impregnation of the sizing agent is removed by drying. In the drying step, there can be employed a known method, for example, a method in which the carbon fiber strand is passed through a drying furnace or a method in which the carbon fiber strand is contacted with a hot roller. The drying temperature is not particularly restricted and is preferably a temperature used ordinarily. For example, when an aqueous emulsion type sizing agent of wide use is impregnated, drying is conducted ordinarily at 80 to 200° C.

After the drying step, the carbon fiber may be treated in a heat treatment step of 200° C. or higher. By this heat treatment, the carbon fiber surface and the sizing agent react with each other, or the sizing agent gives rise to self thermal polymerization and becomes a higher-molecular compound. Consequently, the dissolution and migration of the sizing agent into the epoxy group-containing vinyl ester resin which is to form a matrix resin in the later molding step, is suppressed; finally, the adhesivity at the interface between the carbon fiber and the matrix resin is enhanced.

The carbon fiber-reinforced resin composite material of the present invention is produced preferably by curing the present composition for carbon fiber-reinforced resin composite material, obtained by impregnating a sizing agent-impregnated carbon fiber (D) with a resin mixture comprising an epoxy group-containing vinyl ester resin (A), a radical-polymerizable monomer (B) and a curing agent (C).

For impregnation of the carbon fiber with the resin mixture, there can be employed a known method such as spraying method, dipping method, transfer method or the like. The dipping method is preferred particularly for its wide usability, efficiency, uniform impregnation, etc. In the impregnation with the resin mixture, it is preferred that the carbon fiber strand is in an open state in order to conduct uniform impregnation in a short time.

The carbon fiber strand may be placed in an open state, for example, by squeezing the carbon fiber strand using a roller or a guide or by controlling the in-feed tension of carbon fiber at the fiber-feeding section.

For control of the amount of the resin mixture in the carbon fiber, there is preferred a method of passing the carbon fiber through a short cylindrical die.

The composition for production of carbon fiber-reinforced resin composite material, produced, for example, as above may successively be sent to a molding step to obtain a molded article of intended shape. In this case, the above-mentioned die functions also as a guide for introducing a given number of carbon fiber strands into a mold and has even an action for making easy the introduction into the mold.

The amount of the resin mixture impregnated into the carbon fiber is preferably in a range of 50 to 80% by mass per the total mass of the present composition for carbon fiber-reinforced resin composite material, constituted by the resin mixture and the sizing agent-impregnated carbon fiber.

In the pultrusion molding step, it is preferred to use a temperature-controllable mold for thermal curing. The mold is preferably one which is temperature-controllable by an electric heater or the like. At the inlet of the mold, the resin mixture being squeezed out from the carbon fiber deposits. In order to prevent that this resin mixture deposit cures with the passage of time and sticks to the inlet, it is preferred to keep the temperature of the mold inlet lower than the curing temperature of the curing agent (C). Hence, there is preferred a mold having such a structure that the temperature at or around the mold inlet and the temperature of other mold portion can be controlled each independently. For example, there is employed a structure in which the to-be-heated portions of the mold can be controlled at two or more different temperature levels, and the temperature at or around the inlet is kept lower than the temperature of other mold portion. Thereby, the resin mixture sticking to or around the inlet is prevented from curing, the composition is heated to a higher temperature level and cured at other mold portion, and shaping and molding is conducted. The heating temperature of the composition is different depending upon the formulation of the composition, etc.; however, ordinarily, the temperature at or around the mold inlet is preferably 60 to 100° C. and the curing temperature is preferably 80 to 200° C.

The thus produced carbon fiber-reinforced resin composite material of the present invention has a glass transition temperature of 150° C. or higher, preferably 180° C. or higher and a bending strength of 800 Mpa or higher, preferably 900 Mpa or higher.

EXAMPLES

The present invention is described more specifically below by way of Examples.

Carbon fiber-reinforced resin composite materials were produced under the conditions described in Examples and Comparative Examples. Each carbon fiber strand used, each resin used and each carbon fiber-reinforced resin composite material obtained were measured for their properties according to the following methods.

<Epoxy Equivalent of Resin>

Epoxy equivalent of resin was measured according to JIS K 7236.

In a 1,000 cm³ flask was weighed a resin of an amount ($W_r$) corresponding to $6 \times 10^{-4}$ to $9 \times 10^{-4}$ mol of epoxy group. Thereto was added 10 cm³ of chloroform. The resin was dissolved in the chloroform using a magnetic stirrer, after which the resulting solution was cooled to room temperature. Thereto was added 20 cm³ of acetic acid. Further, 10 cm³ of a tetraethylammonium bromide-acetic acid solution was added. Titration was conducted using a perchloric acid-acetic acid solution. The epoxy equivalent $E_s$ of resin was calculated using the following formula (1).

$$E_s = 1000 \times W_r / [(V_s - V_0) \times \{1 - (t_o - t_s)/100\}] \times C_s \quad (1)$$

$E_s$: epoxy equivalent $V_s$: amount (cm³) of perchloric acid-acetic acid solution consumed up to the end of titration $V_o$: amount (cm³) of perchloric acid-acetic acid solution consumed up to the end of titration in blank test $t_o$: temperature (° C.) of perchloric acid-acetic acid solution in test and blank test $t_s$: temperature (° C.) of perchloric acid-acetic acid solution when it was determined of its concentration $C_s$: concentration (mol/dm³) of perchloric acid-acetic acid solution when it was determined of its concentration <Viscosity of Resin>

Viscosity of resin was measured according to JIS K 6901. 200 g of a resin was taken in a tall beaker of 300 cm³. The beaker was covered with a watch glass. The beaker was allowed to stand for 90 minutes in a thermostat kept at 25° C. Then, the resin was measured for viscosity using a Brookfield viscometer.

<Weight-average Molecular Weight>

Weight-average molecular weight of resin was measured according to gel permeation chromatography.

There was used GPC SYSTEM-21 (detector: differential refractometer) produced by Showa Denko K.K., having a column formed by connecting in series two Shodex GPC LF804 columns produced by Showa Denko K.K. The oven temperature was 40° C. Tetrahydrofuran was used as an eluent. The flow rate of the eluent was 1.0 cm³/min. 0.1 cm³ of a tetrahydrofuran solution containing 0.3% by mass of a resin was injected into the chromatograph. The chromatogram obtained was analyzed using a calibration curve obtained by the measurement using a standard polystyrene under the same conditions, to determine the weight-average molecular weight (polystyrene-reduced) of the resin.

<High Temperature Curing Property>

High temperature curing property was measured referring to the test method for 130° C. curing property specified by JIS K 6901.

A given amount of a curing agent was taken in a 150 cm³ beaker. Thereto was added 100 g of a sample. The mixture was stirred sufficiently with a glass rod until the mixture became uniform. The beaker was covered with a watch glass and the beaker contents were allowed to stand for 45 minutes. Then, the beaker contents were poured into a test tube to a height of 75 mm and a thermocouple was fixed at the center of the sample. The sample-containing test tube was fixed in a bath, equiping thermostat kept at 145° C., so that the surface of the sample was 20 mm below the liquid surface of the bath. The time in which the sample reached the maximum heat generation temperature from 65° C., and the maximum heat generation temperature were measured.

<Volume Shrinkage>

Volume shrinkage of resin was measured according to JIS K 6901.

In a test tube was placed 5 g of a resin mixture obtained by adding, to 100 parts by mass of a mixture of a radical-polymerizable monomer (B) and a resin, 1.5 parts by mass of a peroxyketal type peroxide (Perhexa 3M produced by NOF CORP.) and 0.5 part by mass of a peroxydicarbonate type peroxide (Peroyl TCP produced by NOF CORP.) each as an organic peroxide curing agent (C) and, as necessary, 1.0 part by mass of an imidazole type epoxy resin-curing agent (Curezole 2MZ produced by Shikoku Chemicals Corporation) as an epoxy resin-curing agent.

The resin mixture was heated at 80° C. for 90 minutes and further at 150° C. for 2 minutes to cure the resin mixture. The cured material was cooled to room temperature in a desiccator and measured for density ($d_p$) (g/cm³).

Meanwhile, 5 g of a mixture of the same resin and the same radical-polymerizable monomer, containing no curing agent (C) was heated in a silicone oil heated at 150° C and then measured for density $(d_r)$ (g/cm$^3$). Volume shrinkage of resin was calculated using the following formula (2).

$$S_v=(1-d_r)/d_p\times 100 \quad (2)$$

<Linear Density of Carbon Fiber>

Linear Density of Carbon Fiber was Measured According to JIS K 3911.

A carbon fiber strand not impregnated with any sizing agent was cut into a size of 1 m and the cut carbon fiber strand was placed in a weighing bottle. The cut carbon fiber strand was dried for 90 minutes in a hot air circulation type drier kept at 105° C., in a state that the cover of the weighing bottle was open. The dried strand was allowed to cool to room temperature in a desiccator, the weighing bottle was covered, and the weight [$m_t$ (g)] of the dried strand was measured to 0.1 mg using an electron balance. The linear density [$T_t$ (Tex)] of the carbon fiber was calculated using the following formula (3).

$$T_t=1000\times(m_t-m_o) \quad (3)$$

$m_o$: mass (g) of weighing bottle

<Impregnation Amount of Sizing Agent into Carbon Fiber and Volume Content of Carbon Fiber>

Measurement was made by a sulfuric acid decomposition method, as follows (volume content of carbon fiber was measured according to JIS K 7075).

A test piece (1.6 g for measurement of impregnation amount of sizing agent into carbon fiber and 0.5 g for measurement of volume content of carbon fiber) was cut out and measured for dried mass [$W_p$ (g)]. Then, 30 cm$^3$ of concentrated sulfuric acid was added to the test piece and boiled for 120 minutes. After 5 minutes, several drops of aqueous hydrogen peroxide solution were added drop-wise and heating was made for oxidation reaction until the color generated by decomposition of sizing agent or resin turned transparent. 2 cm$^3$ of a fresh aqueous hydrogen peroxide solution was added, followed by heating for 10 minutes. Then, the reaction mixture was allowed to cool. The reaction mixture after oxidation reaction was filtered through a glass filter to separate a carbon fiber. The carbon fiber was washed by pure water and the carbon fiber was dried together with the glass filter. The carbon fiber from which the sizing agent and the resin had been removed thus, was measured for mass [$W_f$(g)]. Amount [$W_s$ (%)] of sizing agent adhered and volume content [$V_f$(%)] of carbon fiber were calculated from the following formulas (4) and (5).

$$W_s=[(W_p-W_f)/W_p]\times 100 \quad (4)$$

$$V_f=[(W_f/\rho_f)\div(W_p/\rho_p)]\times 100 \quad (5)$$

$\rho_p$: density (g/cm$^3$) of carbon fiber-reinforced resin composite material $\rho_f$: density (g/cm$^3$) of carbon fiber <Bending Strength of Composite Material>

Bending strength of composite material was measured according to JIS K 6913.

A columnar composite material (molded article) was cut into a length of 70 mm to prepare a test piece. The diameter [$D_p$ (mm)] of the test piece was measured using a micrometer. The test piece was measured for failure load [P (N)] using a universal testing machine under the conditions of (distance between fulcra=50 mm) and (cross head speed=3.0 mm/min).

The bending strength [$\sigma_f$ (Mpa)] of the composite material was calculated using the following formula (6).

$$\sigma_f=400\times P/(\pi\times D_p^3) \quad (6)$$

π: ratio of the circumference of circle to its diameter

<Impregnation Property in Resin Bath>

The degree of wetting of resin mixture against carbon fiber strand in resin bath was observed at the time of the evaluation of molding described later. A case in which a resin mixture infiltrated uniformly into a carbon fiber strand quickly (in 20 seconds or less), was expressed as (G); a case in which a resin mixture infiltrated uniformly into a carbon fiber strand slowly (in 60 or less), was expressed as (M); and a case in which a resin mixture was repelled by the sizing agent of carbon fiber and did not infiltrate uniformly into a carbon fiber strand, was expressed as (B).

<Wettability>

A test piece of a molded article was bent and the rupture cross-section of the bent test piece was observed using a scanning electron microscope. A state in which a large amount of the resin remained on the surface of the carbon fiber and sufficient adhesion was seen between the carbon fiber surface and the resin, was expressed as (G); a state in which the resin remained slightly on the surface of the carbon fiber but there was pulling-out of the carbon fiber, indicating insufficient the adhesion between the carbon fiber surface and the resin, was expressed as (M); and a state in which substantially no resin remained on the surface of the carbon fiber (substantial pulling-out) and there was substantially no adhesion between the carbon fiber surface and the resin, was expressed as (B).

<Glass Transition Temperature>

A test piece of a molded article was cut out in a size of 35 mm (length)×2 mm (thickness)×5 mm (width). This test piece was measured using a dynamic viscoelasticity tester at a temperature elevation rate of 2° C./min in a torsion mode (1 Hz, 0.10). The glass transition temperature was determined from the maximum of loss tangent (tan δ).

Example 1

Into a flask provided with a thermometer, a stirrer and a reflux condenser were fed 186 g (1.0 equivalent) of a bisphenol A type epoxy resin [Epikote 828 (epoxy equivalent: 186) produced by Japan Epoxy Resins Co., Ltd.], 51.6 g (0.6 equivalent) of methacrylic acid, 0.11 g (1.0×10$^{-3}$ equivalent) of hydroquinone, and 0.48 g (corresponding to 0.2 part by mass relative to 100 parts by mass of the total of the epoxy resin and the methacrylic acid) of chromium naphthenate (chromium content: 3%). The mixture was heated to 100° C. with air being blown into, to give rise to a reaction for about 10 hours and obtain a reaction product (an epoxy group-containing vinyl ester resin) having an acid number of 0 (zero) and a corresponding to standard polystyrene weight-average molecular weight of 630.

To the reaction product was added a styrene monomer in an amount of 25% by mass of the total, to obtain a resin A-1 having a viscosity of 2.5 dPa·s at 25° C.

A PAN-based carbon fiber (Besfight produced by Toho Tenax Co., Ltd., tensile strength: 5,000 MPa, tensile modulus: 240 GPa, linear density: 800 Tex) was impregnated with 1% by mass of a sizing agent which was a vinyl ester resin (d) (Epoxy Ester 3000M produced by Kyoeisha Chemical Co., Ltd.), to obtain a carbon fiber 1.

To 100 parts by mass of the resin A-1 were added, as organic peroxide curing agents, 1.5 parts by mass of a peroxyketal type peroxide (Perhexa 3M produced by NOF Corp.) and 0.5 part by mass of a peroxydicarbonate type peroxide (Peroyl TCP produced by NOF Corp.) and, as an epoxy resin-curing agent, an imidazole type epoxy resin-curing agent (Curezole 1B2MZ produced by Shikoku Chemicals Corporation). They were mixed and stirred. The resulting mixture was placed into a resin bath.

A paper core bobbin which had taken up the carbon fiber 1, was hanged on a creel for carbon fiber, and a carbon fiber which had been converted so as to have a total linear density of 36,000 Tex, was introduced into the above-mentioned resin bath via a guide. Then, the resin mixture-impregnated carbon fiber was introduced into a die. Through the die, the resin mixture-impregnated carbon fiber was introduced into a mold for curing. The mold was provided with a heating device capable of forming two temperature zones (inlet temperature: 100° C., curing temperature: 160° C.) and had a length of 70 cm and an inner diameter of 6 mm. The composite material obtained by curing was continuously taken off at a rate of 35 cm/min using a take-off device and cut into a length of 3 mm each to obtain a carbon fiber-reinforced resin composite material.

Example 2

Into the same equipment as used in Example 1 were fed 480 g (1.0 equivalent) of a bisphenol A type epoxy resin [Epototo YD-011 (epoxy equivalent: 480) produced by Tohto Kasei Co., Ltd.], 21.6 g (0.3 equivalent) of acrylic acid, 0.06 g ($0.5 \times 10^{-3}$ equivalent) of hydroquinone, and 0.5 g (corresponding to 0.1 part by mass relative to 100 parts by mass of the total of the epoxy resin and the acrylic acid) of chromium naphthenate (chromium content: 3%). The mixture was heated to 100° C. with air being blown into, to give rise to a reaction for about 10 hours and obtain a reaction product (an epoxy group-containing vinyl ester resin) having an acid number of 0 (zero) and a weight-average molecular weight of 2,600 corresponding to standard polystyrene. To the reaction product was added a styrene monomer in an amount of 25% by mass of the total, to obtain a resin A-2 having a viscosity of 3.0 dPa·s at 25° C.

In the same operation as in Example 1 except that the resin A-2 was used, a carbon fiber-reinforced resin composite material was obtained.

Example 3

Into the same equipment as used in Example 1 were fed 250 g (1.0 equivalent) of a bisphenol A type epoxy resin [Epikote 834 (epoxy equivalent: 250) produced by Japan Epoxy Resins Co., Ltd.], 38.7 g (0.45 equivalent) of methacrylic acid, 0.08 g ($0.7 \times 10^{-3}$ equivalent) of hydroquinone, and 0.9 g (corresponding to 0.3 part by mass relative to 100 parts by mass of the total of the epoxy resin and the methacrylic acid) of chromium naphthenate (chromium content: 3%). The mixture was heated to 100° C. with air being blown into, to give rise to a reaction for about 10 hours and obtain a reaction product (an epoxy group-containing vinyl ester resin) having an acid number of 0 (zero) and a weight-average molecular weight of 1,700 corresponding to standard polystyrene. To the reaction product was added a styrene monomer in an amount of 32% by mass of the total, to obtain a resin A-3 having a viscosity of 3.2 dPa·s at 25° C.

In the same operation as in Example 1 except that the resin A-3 was used, a carbon fiber-reinforced resin composite material was obtained.

Comparative Example 1

A carbon fiber-reinforced resin composite material was obtained in the same operation as in Example 1 except that there was used a carbon fiber 2 obtained by impregnating a sizing agent which was a urethane-modified epoxy resin containing no epoxy group in the molecule (N320 produced by DIC), into the PAN-based carbon fiber used in Example 1 (Besfight produced by Toho Tenax Co., Ltd., tensile strength: 5,000 MPa, tensile modulus: 240 GPa, linear density: 800 Tex).

Comparative Example 2

Into the same equipment as used in Example 1 were fed 250 g (1.0 equivalent) of a bisphenol A type epoxy resin [Epikote 834 (epoxy equivalent: 250) produced by Japan Epoxy Resins Co., Ltd.], 86 g (1.0 equivalent) of methacrylic acid, 0.15 g ($1.4 \times 10^{-3}$ equivalent) of hydroquinone, and 1.0 g (corresponding to 0.3 part by mass relative to 100 parts by mass of the total of the epoxy resin and the methacrylic acid) of chromium naphthenate (chromium content: 3%). The mixture was heated to 100° C. with air being blown into, to give rise to a reaction for about 15 hours. The reaction was stopped to obtain a reaction product having an acid number of 7, a weight-average molecular weight of 1,900 corresponding to standard polystyrene, epoxy group of 0.04 equivalent and an ethylenically unsaturated group of 0.96 equivalent. To the reaction product was added a styrene monomer in an amount of 40% by mass of the total, to obtain a resin B-1 having a viscosity of 2.8 dPa·s at 25° C.

In the same operation as in Example 1 except that there was used the resin B-1 but no epoxy resin-curing agent was used, a carbon fiber-reinforced resin composite material was obtained.

Comparative Example 3

A carbon fiber-reinforced resin composite material was obtained in the same operation as in Example 1 except that there were used the carbon fiber 2 and the resin B-1 but no epoxy resin-curing agent was used.

Comparative Example 4

Into the same equipment as used in Example 1 were fed 178 g of a phenol novolac type epoxy resin [Epiclon N-740 (epoxy equivalent: 178) produced by DIC], 7.2 g (0.1 equivalent) of acrylic acid, 0.09 g ($0.82 \times 10^{-3}$ equivalent) of hydroquinone, and 0.4 g of chromium naphthenate (chromium content: 3%). The mixture was heated to 100° C. with air being blown into, to give rise to a reaction for about 6 hours and obtain a reaction product having an acid number of 0 (zero) and a weight-average molecular weight of 840 corresponding to standard polystyrene. To the reaction product was added a styrene monomer in an amount of 20% by mass of the total, to obtain a resin B-2 having a viscosity of 5.0 dPa·s at 25° C.

In the same operation as in Example 1 except that there was used the resin B-2, a carbon fiber-reinforced resin composite material was obtained.

Comparative Example 5

Into the same equipment as used in Example 1 were fed 950 g of a bisphenol A type epoxy resin [Epototo YD-014 (epoxy equivalent: 950) produced by Tohto kasei Co., Ltd.], 73.1 g (0.85 equivalent) of methacrylic acid, 0.15 g ($1.4 \times 10^{-3}$ equivalent) of hydroquinone, and 1.0 g of chromium naphthenate (chromium content: 3%). The mixture was heated to 100° C. with air being blown into, to give rise to a reaction for about 9 hours and obtain a reaction product having an acid number of 0 (zero) and a polystyrene-reduced weight-average molecular weight of 3100. To the reaction product was added a styrene monomer in an amount of 25% by mass of the total, to obtain a resin B-3 having a viscosity of 9.0 dPa·s at 25° C.

In the same operation as in Example 1 except that there was used the resin B-3, a carbon fiber-reinforced resin composite material was obtained.

The evaluation results of Examples 1 to 3 and Comparative Examples 1 to 5 are shown in Tables 1 and 2. Examples 4 and 5 and Comparative Examples 6 and 7

Carbon fiber-reinforced resin composite materials were obtained in the same operation as in Example 1 except that the impregnation amount of the sizing agent was changed as sown in Tables 1 and 2. The evaluation results thereof are shown in Tables 1 and 2.

TABLE 1

| | Example | | | | |
|---|---|---|---|---|---|
| | 1 | 2 | 3 | 4 | 5 |
| Kind of carbon fiber | a | a | a | a | a |
| Impregnation amount of sizing agent (% by mass) | 1.0 | 1.0 | 1.0 | 4.0 | 0.6 |
| Kind of resin | A-1 | A-2 | A-3 | A-1 | A-1 |
| Epoxy group: ethylenically unsaturated group (equivalent) | 0.4:0.6 | 0.7:0.3 | 0.55:0.45 | 0.4:0.6 | 0.4:0.6 |
| Maximum heat generation temperature of resin (° C.) | 245 | 240 | 250 | 245 | 245 |
| Time up to maximum heat generation temperature (sec) | 130 | 160 | 135 | 130 | 130 |
| Volume shrinkage of resin (%) | 6 | 5 | 6.5 | 6 | 6 |
| Volume content of carbon fiber (%) | 70 | 70 | 70 | 70 | 70 |
| Impregnatability in resin bath | (G) | (G) | (G) | (G) | (G) |
| Wettability | (G) | (G) | (G) | (G) | (G) |
| Glass transition temperature (° C.) | 180 | 182 | 186 | 181 | 180 |
| Bending strength (Mpa) | 920 | 940 | 950 | 900 | 930 |

TABLE 2

| | Example | | | | | | |
|---|---|---|---|---|---|---|---|
| | 1 | 2 | 3 | 4 | 5 | 6 | 7 |
| Kind of carbon fiber | B | a | B | a | a | a | a |
| Adhesion amount of sizing agent (% by mass) | 1.0 | 1.0 | 1.0 | 1.0 | 1.0 | 7.0 | 0.2 |
| Kind of resin | A-1 | B-1 | B-1 | B-2 | B-3 | A-1 | A-1 |
| Epoxy group: ethylenically unsaturated group (equivalent) | 0.4:0.6 | 0.04:0.96 | 0.04:0.96 | 0.9:0.1 | 0.15:0.85 | 0.4:0.6 | 0.4:0.6 |
| Maximum heat generation temperature of resin (° C.) | 245 | 235 | 235 | 225 | 230 | 245 | 245 |
| Time up to maximum heat generation temperature (sec) | 130 | 100 | 100 | 290 | 120 | 130 | 130 |
| Volume shrinkage of resin (%) | 6 | 7 | 7 | 4 | 6.8 | 6 | 6 |
| Volume content of carbon fiber (%) | 70 | 70 | 70 | 70 | 70 | 70 | 70 |
| Impregnatability in resin bath | (B) | (G) | (B) | (G) | (G) | (M) | (M) |
| wettability | (B) | (M) | (B) | (G) | (M) | (G) | (M) |
| Glass transition temperature (° C.) | 179 | 151 | 148 | 140 | 160 | 181 | 179 |
| Bending strength (Mpa) | 410 | 800 | 560 | 650 | 800 | 870 | 830 |

The fracture cross-sections of the carbon fiber-reinforced resin composite materials obtained in Examples 1 to 3 and Comparative Examples 1 to 5 were observed using an electron microscope. The electron micrograph of each fracture cross-section is shown in FIGS. 1 to 8.

Figure 4:
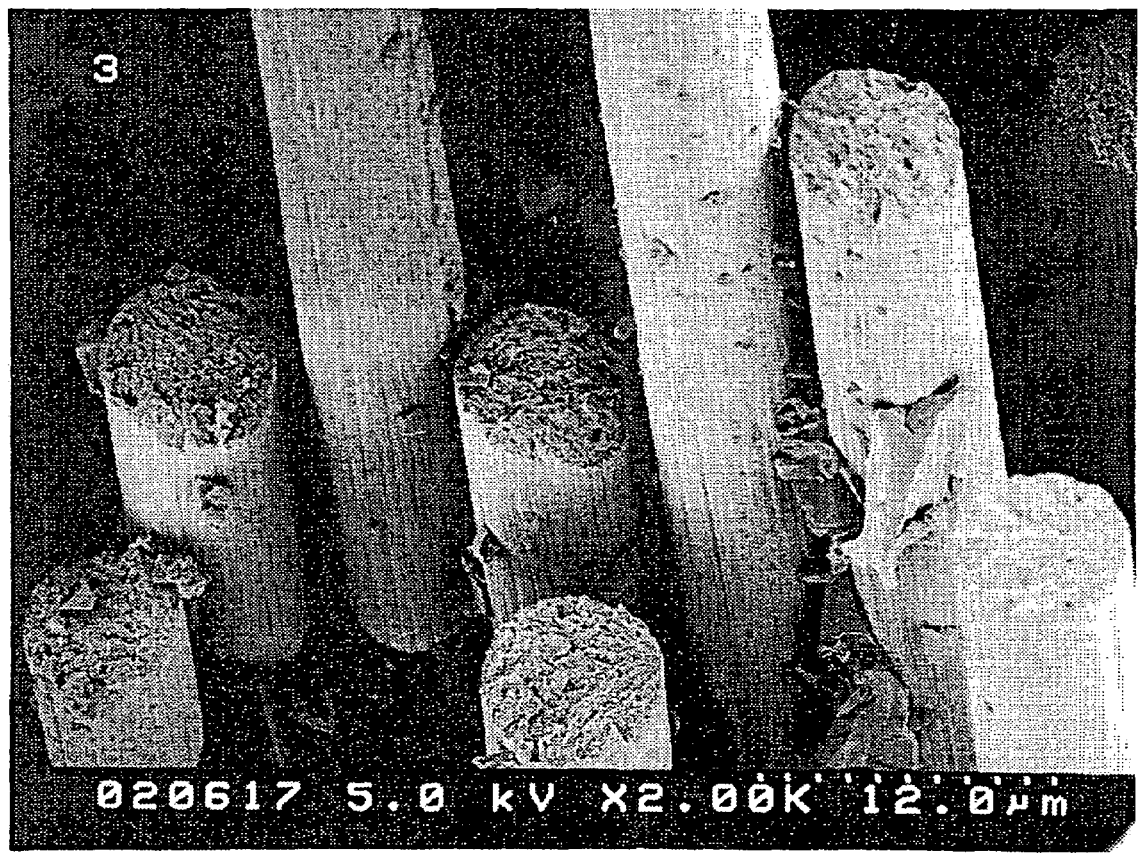
Figure 5:
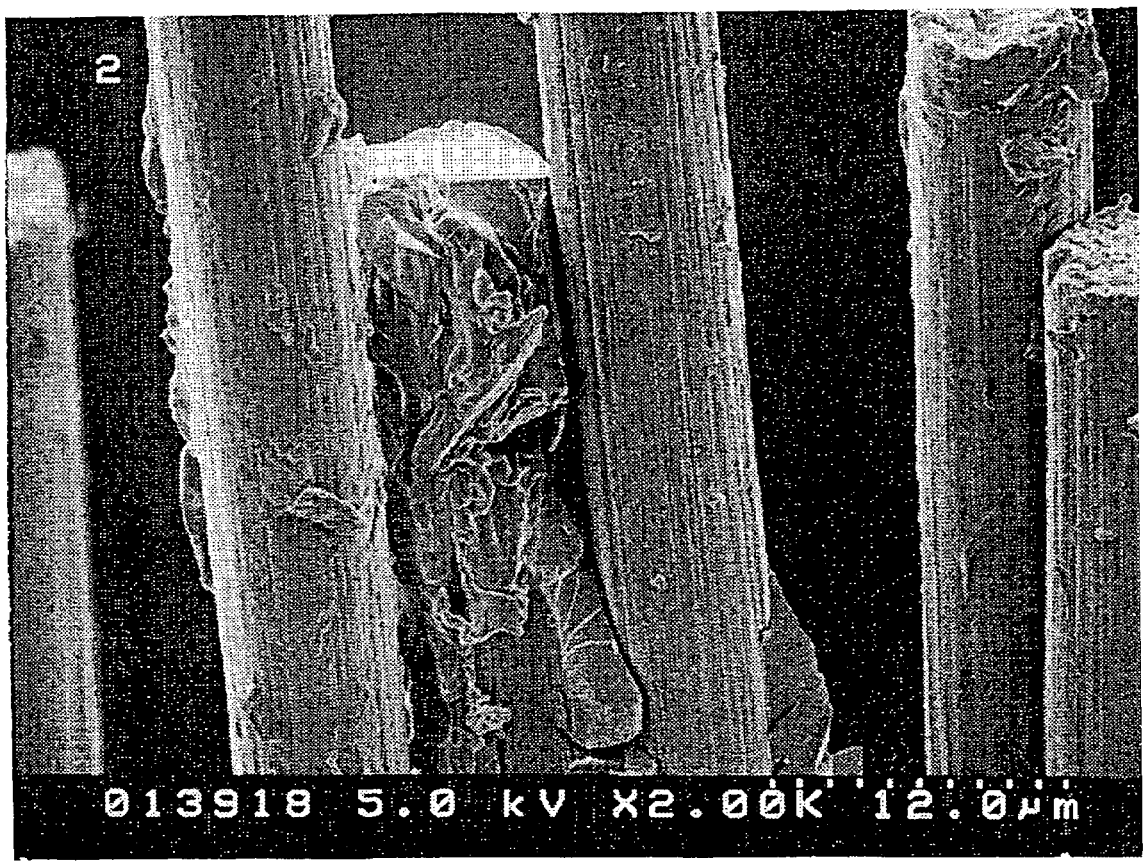
Figure 6:
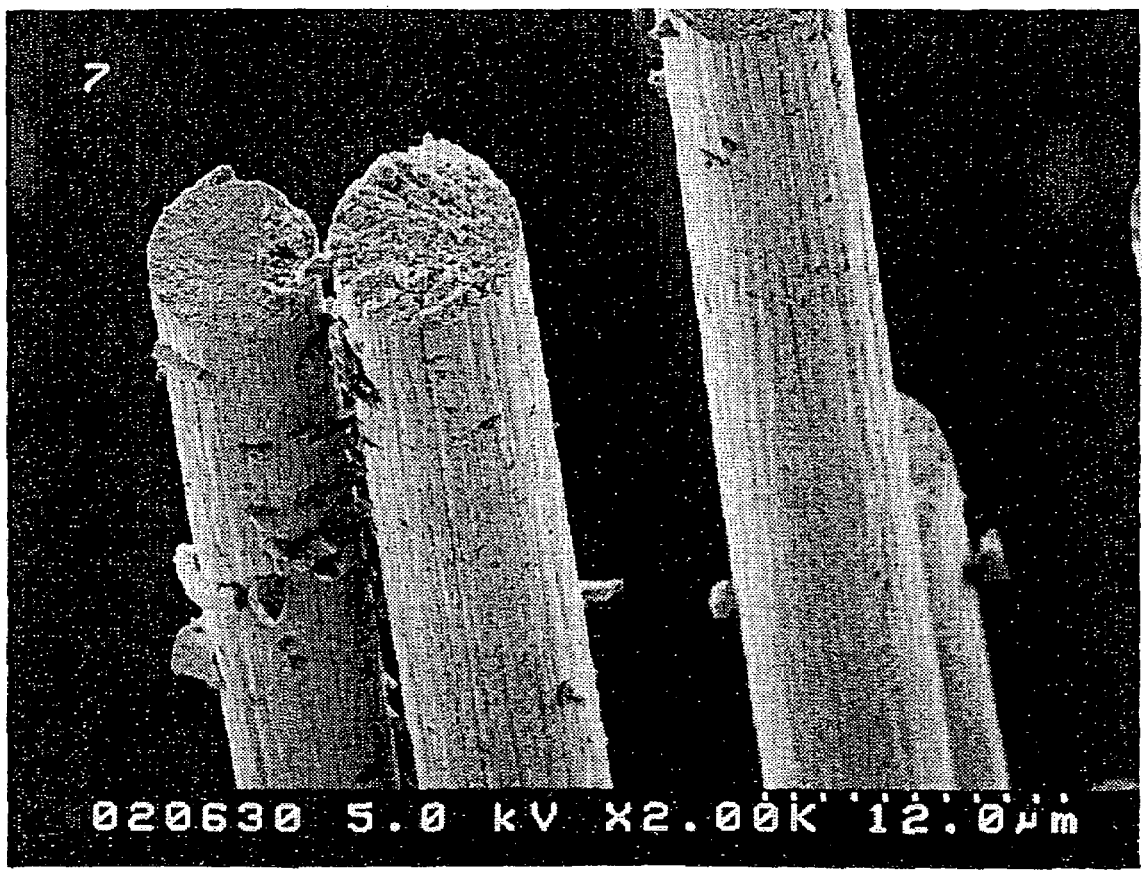
Figure 7:
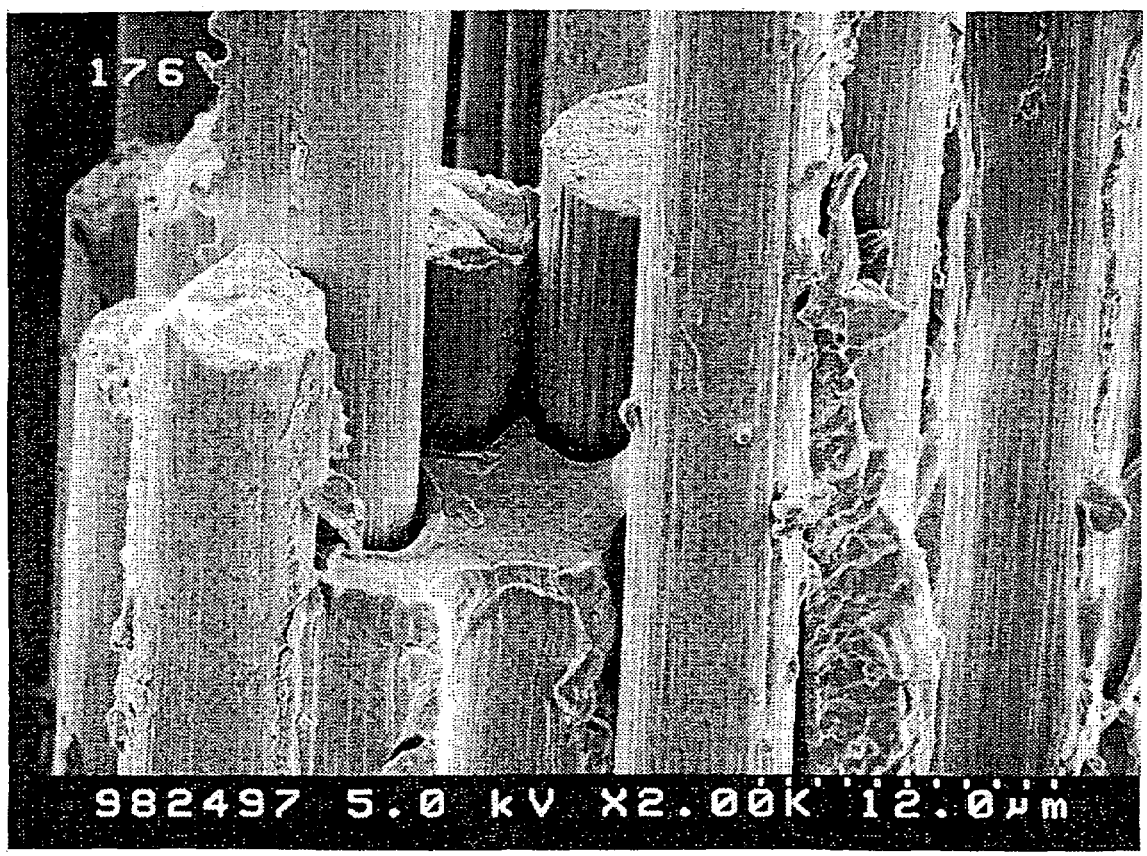
Figure 8:
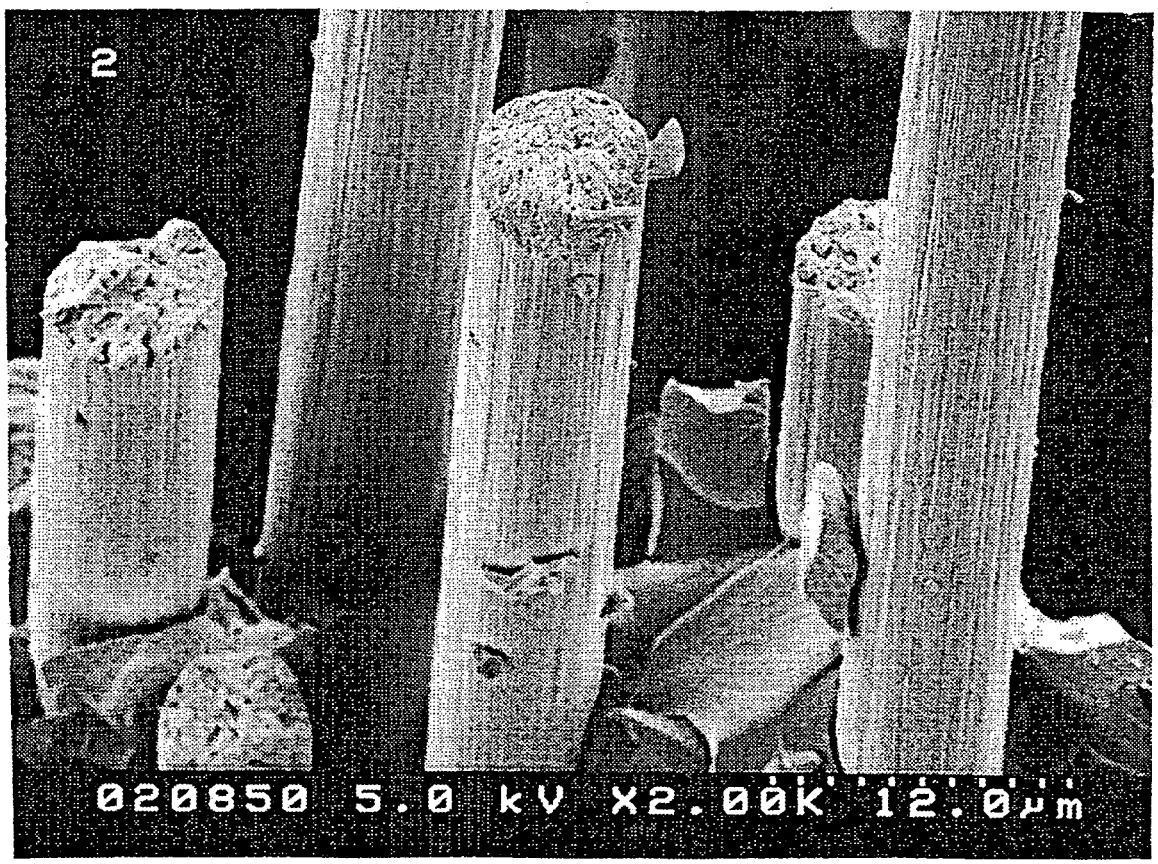

In the composite materials obtained in Examples 1 to 3 and Comparative Example 4, the compatibility between the matrix resin and the carbon fiber was good and the matrix resin remained on the surface of the carbon fiber in a large amount (FIGS. 1, 2, 3 and 7). However, in the composite material obtained in Comparative Example 4, the curing time was long and the glass transition temperature and the bending strength were both low. In the composite materials obtained in Comparative Examples 1 and 3, pulling-out was striking and substantially no matrix resin was present on the carbon fiber surface (FIGS. 4 and 6). In the composite materials obtained in Comparative Examples 2 and 5, the matrix resin was present slightly on the carbon fiber surface but pulling-out was striking (FIGS. 5 and 8).

The invention claimed is:

1. A carbon fiber-reinforced resin composite material produced by curing a composition comprising
   (1) a resin mixture comprising:
      (A) an epoxy group-containing vinyl ester resin having, in the molecule, 0.8 to 0.3 equivalent of epoxy group and 0.2 to 0.7 equivalent of an ethylenically unsaturated group,
      (B) a radical-polymerizable monomer, and
      (C) a curing agent comprising an organic peroxide curing agent and a curing agent for epoxy resin, and
   (2)
      (D) a carbon fiber in form strand impregnated with a sizing agent for bundling of carbon fiber filaments in an amount of 0.3 to 5% by mass based on the carbon fiber (D), wherein the sizing agent contains (d) a vinyl ester resin, having substantially no epoxy group, in an amount of 30% by mass of more, which is obtained by an addition reaction of an epoxy resin and an ethylenically unsaturated carboxylic acid, wherein the carbon fiber-reinforced resin composite material has a bending strength of 900 Mpa or higher.

2. A carbon fiber-reinforced resin composite material according to claim 1, wherein the curing agent for epoxy resin is an imidazole.

3. A carbon fiber-reinforced resin composite material according to claim 1, wherein the ethylenically unsaturated group possessed by the epoxy group-containing vinyl ester resin (A) is an acrylic acid or a methacrylic acid residue.

4. A carbon fiber-reinforced resin composite material according to claim 1, which has a Tg of 150° C. or higher.

5. A composition for production of carbon fiber-reinforced resin composite material, comprising
   (1) a resin mixture comprising:
      (A) an epoxy group-containing vinyl ester resin having, in the molecule, 0.8 to 0.3 equivalent of epoxy group and 0.2 to 0.7 equivalent of an ethylenically unsaturated group,
      (B) a radical-polymerizable monomer,
      (C) a curing agent comprising an organic peroxide curing agent and a curing agent for epoxy resin, and
   (2)
      (D) a carbon fiber in a form strand impregnated with a sizing agent for bundling of carbon fiber filaments in an amount of 0.3 to 5% by mass based on the carbon fiber (D), wherein the sizing agent contains (d) a vinyl ester resin, having substantially no epoxy group, in an amount of 30% by mass of more, which is obtained by an addition reaction of an epoxy resin and an ethylenically unsaturated carboxylic acid, wherein the carbon fiber-reinforced resin composite material has a bending strength of 900 Mpa or higher.

6. A composition for production of carbon fiber-reinforced resin composite material according to claim 5, wherein the curing agent for epoxy resin is an imidazole.

7. A composition for production of carbon fiber-reinforced resin composite material according to claim 5, wherein the ethylenically unsaturated group possessed by the epoxy group-containing vinyl ester resin (A) is an acrylic acid residue or a methacrylic acid residue.

8. A composition for production of carbon fiber-reinforced resin composite material according to claim 5, which comprises:
   the epoxy group-containing vinyl ester resin (A) in an amount of 100 parts by mass,
   the radical-polymerizable monomer (B) in an amount of 10 to 50 parts by mass,
   the organic peroxide contained in the curing agent (C), in an amount of 0.1 to 5 parts by mass relative to 100 parts by mass of the total of the components (A) and (B),
   the curing agent for epoxy resin contained in the curing agent (C), in an amount of 0.1 to 5 parts by mass relative to 100 parts by mass of the total of the components (A) and (B),
   the sizing agent in an amount of 0.3 to 5% by mass based on the carbon fiber (D) impregnated with the sizing agent, and
   the carbon fiber (D) in an amount of 50 to 80% by mass based on the total mass of the composition for production of carbon fiber-reinforced resin composite material.

9. Amended) A process for producing a carbon fiber-reinforced resin composite material, which comprises impregnating (D) a carbon fiber impregnated with 0.3 to 5% by mass of a sizing agent, containing (d) a vinyl ester, having substantially no epoxy group, in an amount of 30% by mass or more, which is obtained by an addition reaction of an epoxy resin and an ethylenically unsaturated carboxylic acid, with a resin mixture of (A) an epoxy group-containing vinyl ester resin having, in the molecule, 0.8 to 0.3 equivalent of epoxy group and 0.2 to 0.7 equivalent of an ethylenically unsaturated group, (B) a radical-polymerizable monomer and (C) a curing agent comprising an organic peroxide curing agent and a curing agent for epoxy resin, wherein the carbon fiber-reinforced resin composite material has a bending strength of 900 Mpa or higher.

10. A process for producing a pultrusion product, which comprises impregnating (D) a carbon fiber impregnated with 0.3 to 5% by mass of a sizing agent, containing (d) a vinyl ester, having substantially no epoxy group, in an amount of 30% by mass or more, which is obtained by an addition reaction of an epoxy resin and an ethylenically unsaturated carboxylic acid, with a resin mixture of (A) an epoxy group-containing vinyl ester resin having, in the molecule, 0.8 to 0.3 equivalent of epoxy group and 0.2 to 0.7 equivalent of an ethylenically unsaturated group, (B) a radical-polymerizable monomer and (C) a curing agent comprising an organic peroxide curing agent and a curing agent for epoxy resin, to obtain a composition for production of carbon fiber-reinforced resin composite material and then subjecting the composition for production of carbon fiber-reinforced resin composite material to pultrusion. wherein the carbon fiber-reinforced resin composite material has a bending strength of 900 Mpa or higher.

* * * * *